Patented May 8, 1951

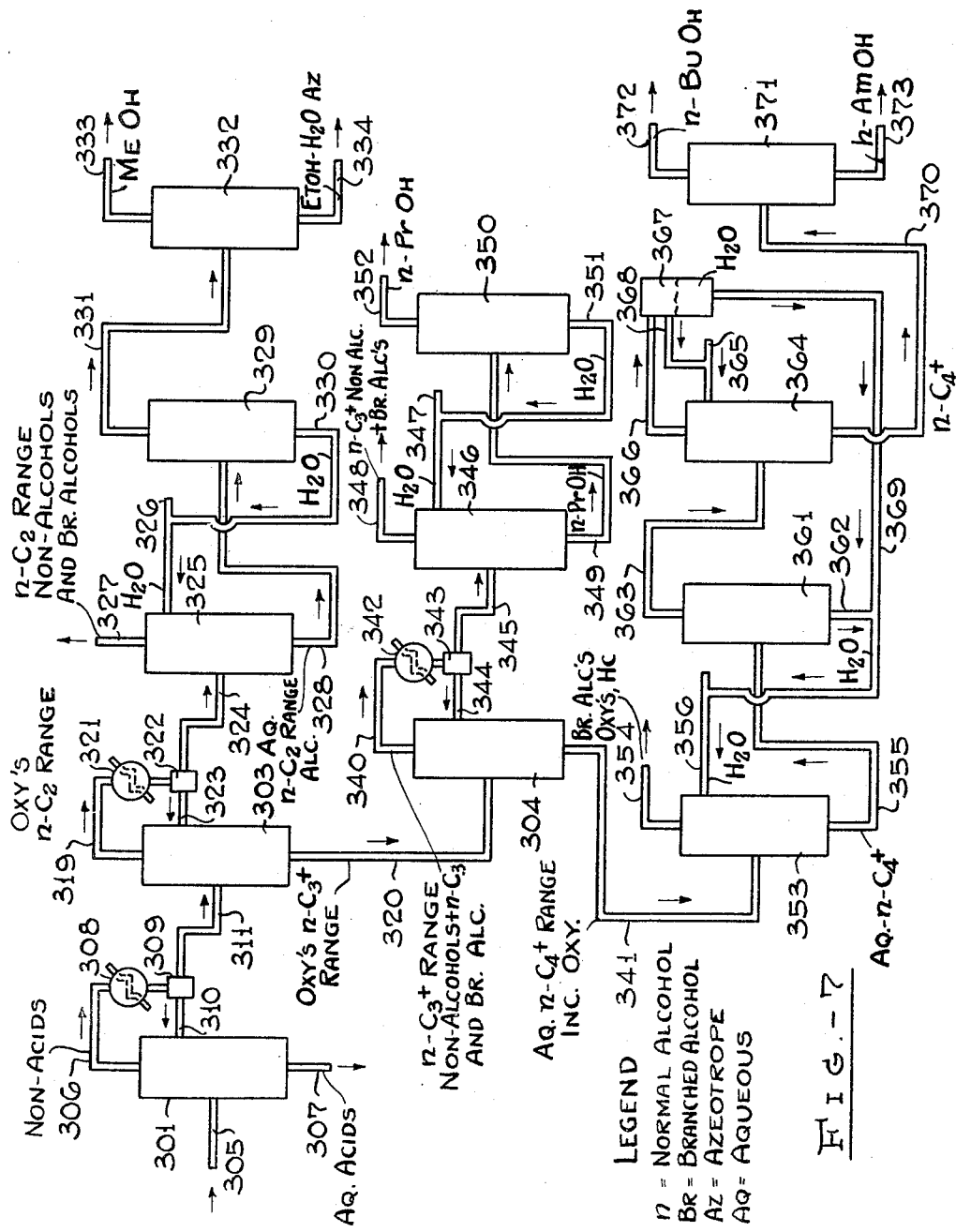

2,551,584

UNITED STATES PATENT OFFICE 2,551,584

EXTRACTIVE DISTILLATION OF NORMAL PRIMARY ALCOHOLS

Carl S. Carlson, Elizabeth, and Charles E. Morrell and Paul V. Smith, Jr., Westfield, N. J., assignors to Standard Oil Development Company, a corporation of Delaware Application June 24, 1948, Serial No. 34,896

16 Claims. (Cl. 202—39.5)

This invention relates to a practical method of separating wide-boiling mixtues of oxygenated organic compounds and more particularly relates to the segregation of the normal primary alcohols from such a wide-boiling mixture.

Wide-boiling mixtures of oxygenated organic compounds may be obtained, for example by the Fischer synthesis in which carbon monoxide is reacted with hydrogen to produce a mixture of hydrocarbons and oxygenated organic compounds which separate into an oil layer and a water layer, both of which contain various hydrocarbons, ketones, aldehydes, ethers, acetals, ketals, esters, carboxylic acids, normal primary, branched chain primary, secondary and tertiary alcohols of a wide range of molecular weights. The process of the present invention is particularly adapted to the treatment of the water layer from the Fischer synthesis but may also be applied to the oil layer and gas phases after an appropriate scrubbing procedure, e. g., using water to separate the oxygenated compounds as a water solution. Still another source of these wide-boiling mixtures of oxygenated organic compounds is in the products of hydrocarbon oxidation where both oil and water layers are obtained, each of which contains oxygenated organic compounds. A typical example of the composition of the water layer obtained in the Fischer process is as follows:

| | Normal Boiling Pt., °C. | Azeotrope with H$_2$O, Boiling Pt., °C. |
|---|---|---|
| Water (90.1 wt. Per cent) | | |
| Alcohols (3.7 wt. Per cent): | | |
| methyl | 64.7 | none |
| ethyl | 78.5 | 78.1 |
| isopropyl | 82.3 | 80.4 |
| tertiary butyl | 82.8 | 79.9 |
| normal propyl | 97.2 | 87.7 |
| secondary butyl | 99.5 | 87.5 |
| isobutyl | 107.3 | 89.9 |
| normal butyl | 117.7 | 92.2 |
| normal amyl | 138 | 95.8 |
| secondary amyl | 119.9 | 92.3 |
| tertiary amyl | 102.4 | 87.2 |
| iso amyl | 131.6 | 95.2 |
| Aldehydes (1.0 wt. Per cent): | | |
| acetaldehyde | 20.2 | none |
| propionaldehyde | 48.8 | none |
| n-butyraldehyde | 75.7 | 68 |
| normal valeraldehyde | 103.7 | 80.6 |
| isovaleraldehyde | 92.5 | 82 |
| Ketones (0.6 wt. Per cent): | | |
| acetone | 56.1 | none |
| methyl ethyl ketone | 79.6 | 73.6 |
| methyl propyl ketone | 102.3 | 82.9 |
| methyl isopropyl ketone | 94.3 | |
| methyl normal butyl ketone | 127.8 | |
| methyl isobutyl ketone | 116.0 | 87.9 |
| diethyl ketone | 102.0 | |
| Esters (0.1 wt. Per cent): | | |
| ethyl acetate | 77.2 | 70.4 |
| normal propyl acetate | 101.6 | 82.4 |
| ethyl propionate | 99.1 | 81.2 |
| Acids (4.5 wt. Per cent): | | |
| acetic | 118 | none |
| propionic | 141 | 99.98 |
| butyric | 162.5 | 99.4 |
| valeric | 185 | 99.5 |
| Hydrocarbons (trace) | | |
| Ethers (trace) | | |
| Ketals (trace) | | |
| Acetals (trace) | | |

The separation of the normal primary alcohols from such a complex mixture is difficult to accomplish and cannot be done entirely by ordinary distillation because of the fact that many of the compounds boil within very narrow ranges or form aqueous azeotropes boiling close together. In addition, the alcohols form azeotropes with other oxy compounds, with and without water as a component, thus further complicating the separation.

If the crude aqueous mixtures of the alcohols are subjected to ordinary fractionation, it is quite feasible to obtain narrow cuts which contain the following types of alcohol mixtures, although in practical separations alcohols from one group are generally found in the preceding and succeeding groups due to the inefficiency of the fractionating system:

TABLE I

*Narrow-boiling range mixtures of alcohols*

| | Components | Normal B. P., °C. | Aqueous Azeotrope B. P., °C. |
|---|---|---|---|
| Group I | methanol | 64.7 | |
| | ethanol | 78.3 | 78.1 |
| | isopropanol | 82.4 | 80.2 |
| Group II | normal propanol | 97.2 | 87.7 |
| | isobutanol | 107.9 | 88.9 |
| | secondary butanol | 99.5 | 88.5 |
| | tertiary pentanol | 101.8 | 87.0 |
| Group III | normal butanol | 117.7 | 92.2 |
| | isopentanol | 131.6 | 95.2 |
| | secondary pentanol | 119.2 | 92.3 |
| | normal pentanol | 137.9 | 95.0 |
| | pentanol-3 | 115.4 | 91.7 |

It is to be noted that the aqueous azeotropes of the alcohols in the above types of narrow-cut mixtures have boiling points which differ less than 5° C., which fact makes difficult their further separation by ordinary fractionation even if the narrow boiling range mixture is only a binary or tertiary mixture of the alcohols. Generally, the crude mixtures contain more than two of the alcohols and other oxygenated organic compounds that interfere with separation by ordinary fractionation, but these do not interfere with the basic operation of this invention in isolating the desired principal alcohol components of the mixtures.

It has been previously proposed to separate the normal primary alcohols by first fractionating the water layer obtained in the Fischer synthesis in the presence of a large quantity of aqueous reflux to remove the non-alcoholic constituents and then to fractionate the alcohols, after first removing the bulk of the water, in the presence of large quantities of aqueous reflux to obtain a bottoms fraction which consists wholly of normal primary alcohols free from secondary, tertiary and branched chain primary alcohols. However, this method has the disadvantage that in many cases large amounts of the normal amyl and higher normal alcohols are lost in the rejected fraction containing the secondary, tertiary and branched chain primary alcohols. Under some circumstances even the normal butyl alcohol may be lost.

According to this invention a separation is effected between normal primary alcohols and branched primary, secondary and tertiary alcohols by subjecting the same to fractional distillation to separate the mixture into fractions based on the boiling range of the normal primary alcohols present in the fractions, for example, into a fraction containing all compounds boiling in the range of normal primary alcohols having up to and including two carbon atoms per molecule and a fraction containing all compounds boiling in the range of normal primary alcohols having more thaan two carbon atoms, and then subjecting each fraction to extractive distillation employing water as the extractive distillation solvent to separate the branched alcohols present in each fraction from the normal primary alcohols.

In copending application Serial Number 34,897, filed June 24, 1948, there is described a process operated under conditions whereby separation between normal primary alcohols and branched primary, secondary and tertiary alcohols can be effected without preliminary fractionation of the feed stock. These conditions are two, namely, (1) that the alcohol mixture be predominantly ethanol and the other alcohols are present in relatively small quantities, and (2) that the amount of water in the internal reflux be maintained within closely controlled limits from 83 to 93.5 mol per cent, preferably 86 to 91 mol per cent.

It is therefore the main object of this invention to provide a process wherein all of the normal primary alcohols are obtained free of the secondary, tertiary and branched chain primary alcohols.

This and other objects of this invention are accomplished by separating the aqueous mixture of normal and branched primary, secondary, and tertiary alcohols, either before or after separation of the non-alcoholic constituents, into two or more fractions and then distilling each of these fractions in the presence of large quantities of solvent so as to remove an overhead fraction containing in addition to non-alcoholic oxygenated compounds (if present) and water, only branched primary, secondary, and tertiary alcohols free of normal primary alcohols.

Certain preferred details of operation together with additional objects and advantages will be apparent, and the invention itself will be best understood by reference to the following specification and to the accompanying drawings, wherein:

Figures 1, 2 and 3 are charts representing the volatilities of various alcohols relative to ethyl alcohol in aqueous solutions.

Figure 4 illustrates a flow plan of a unit for obtaining separation of normal primary alcohols from branched primary, secondary and tertiary alcohols. In the figure the designation "Br—$n$—$C_2$ range" on line 27 designates branched alcohols boiling in the range of the normal primary alcohols having up to and including 2 carbon atoms per molecule; while the designation "Br—$n$—$C_3+$ range" on line 48 means those branched alcohols boiling in the range of normal primary alcohols having 3 or more carbon atoms per molecule.

Figure 5 illustrates a flow plan of a modification of Figure 4. The designation "Br—$n$—$C_2$ range" on line 27 has the same meaning as indicated in Figure 4. The designation "Br—$n$—$C_3$ range" on line 109 means branched alcohols boiling in the range of normal propanol; while the designation "Br—$n$—$C_4+$" on line 115 means branched alcohols boiling in the range of the normal primary alcohols having 4 and more carbon atoms per molecule.

Figure 7 illustrates a flow plan of another modification of the process shown in Figure 4.

The present invention is made possible by the discovery that when a mixture of oxygenated compounds, such as those mentioned above, is distilled in the presence of a sufficiently large volume of an aqueous reflux, the normal volatilities of the compounds are altered and many separations which are impossible by ordinary fractionation become possible in the presence of the excess water. However, when this principle is used to separate economically desirable normal primary alcohols from economically not-so-desirable branched primary, secondary and tertiary alcohols, in very wide-boiling mixtures, the volatilities of many of the normal primary alcohols are so closely similar to those of some of the less desirable alcohols that complete segregation of the normal primary alcohols is difficult, if not impossible, to achieve.

Figure 1:
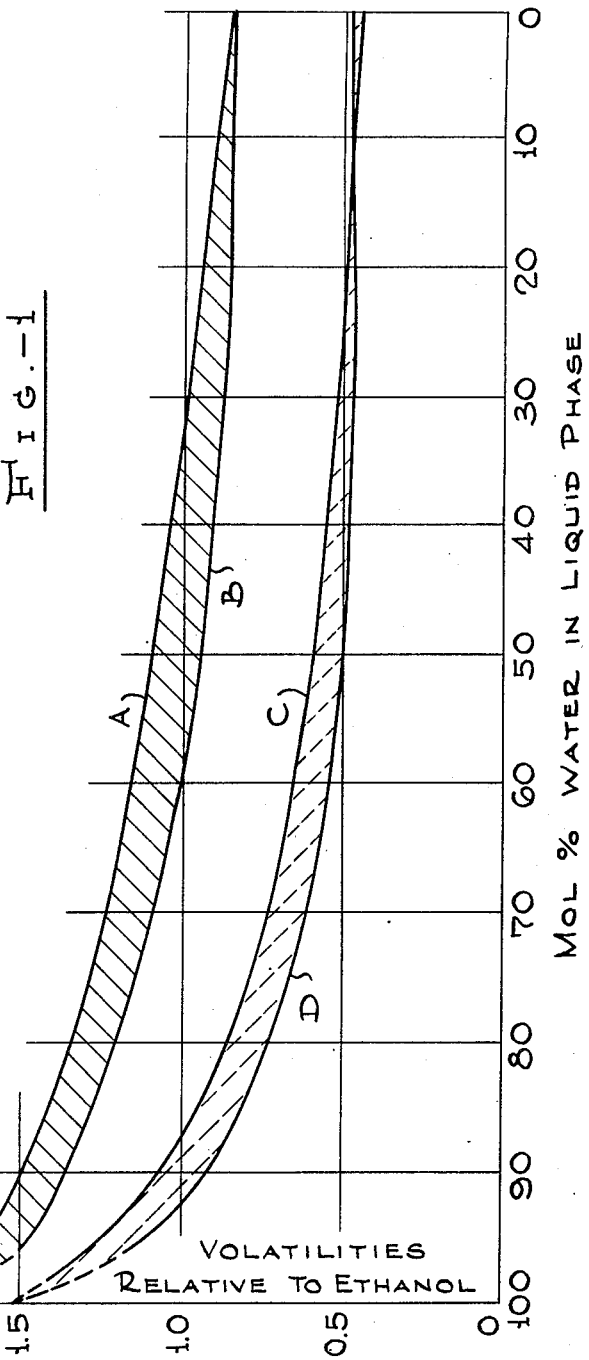
Figure 2:
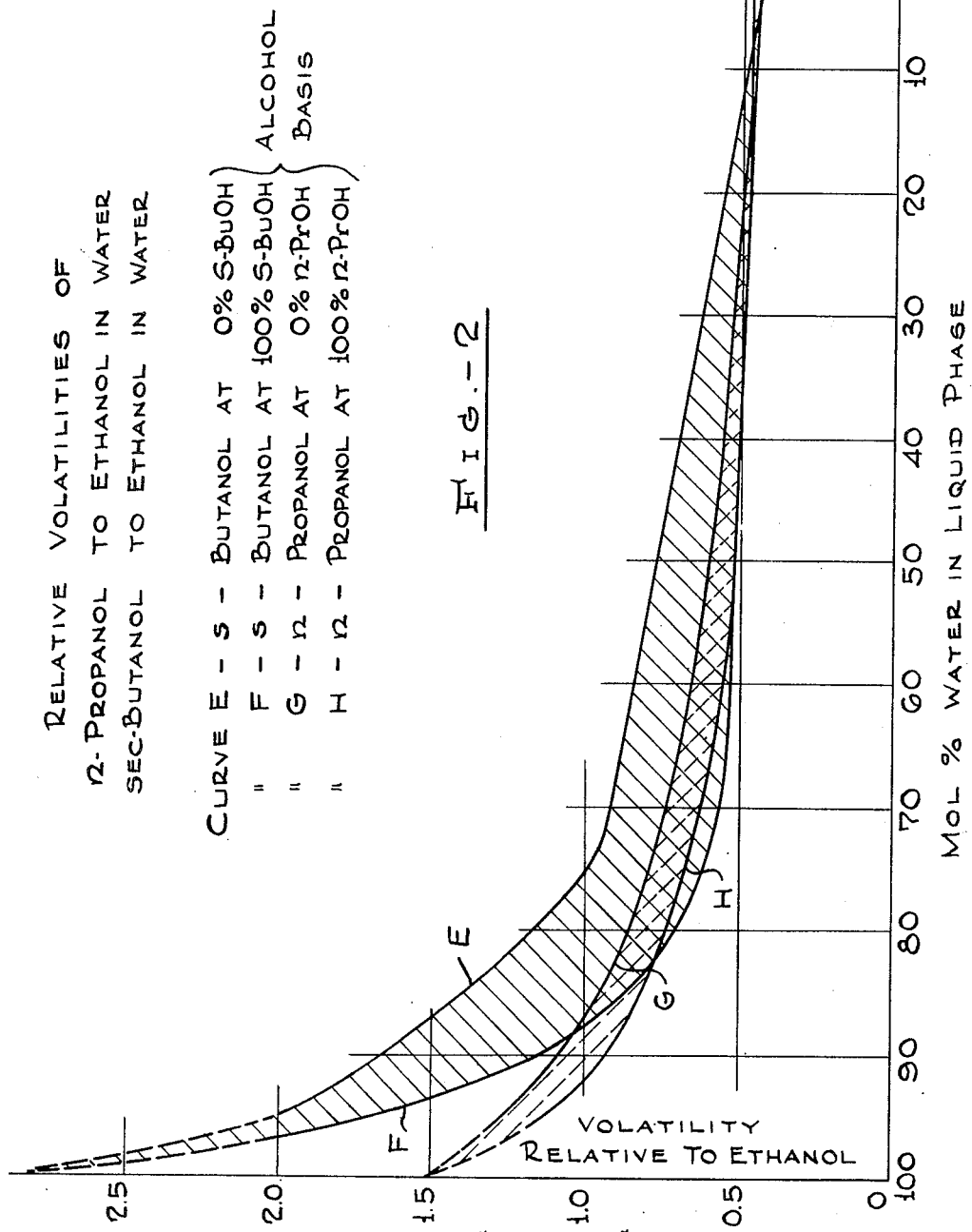

It has been found, by varying the concentration of water in the reflux, that the volatilities of the various alcohols in wide-boiling mixtures can be shifted, but even with the use of the most desirable water concentration the segregation is not complete. This is evident from a study of the charts illustrated in Figures 1, 2 and 3. In these charts the volatilities of iso and normal propanol, secondary and normal butanol, and normal amyl alcohols are shown graphically relative to ethanol. The curves plot respectively the change in volatility of the given alcohol with change in the amount of water in the liquid phase at the limiting values of zero and 100% concentration of the alcohols in ethanol. Thus the area between the curves represents the total possible range in volatility with respect to ethanol and water content for each of the alcohols shown. From Figure 1 it is evident that the volatilities of normal and isopropyl alcohols approach each other closely in the region between 90 mol percent water and infinite dilution and that separation between these two alcohols is most readily accomplished at water concentrations below 70 mol percent. Furthermore, the isopropanol curve shows that a reasonable volatility of this compound relative to ethanol can be obtained at 80 mol per cent water, increasing with increasing water concentration, thus permitting separation between ethanol and isopropanol at concentrations of water above 80 mol percent. From Figure 2 it is evident that the volatilties of secondary butanol and normal propanol relative to ethanol are almost identical over most of the range of water concentrations although sec-butanol shows much greater volatility variation with variation in alcohol composition. The curves also show that separation can be accomplished readily in the region between 95 mol percent water and infinite dilution.

Figure 3:
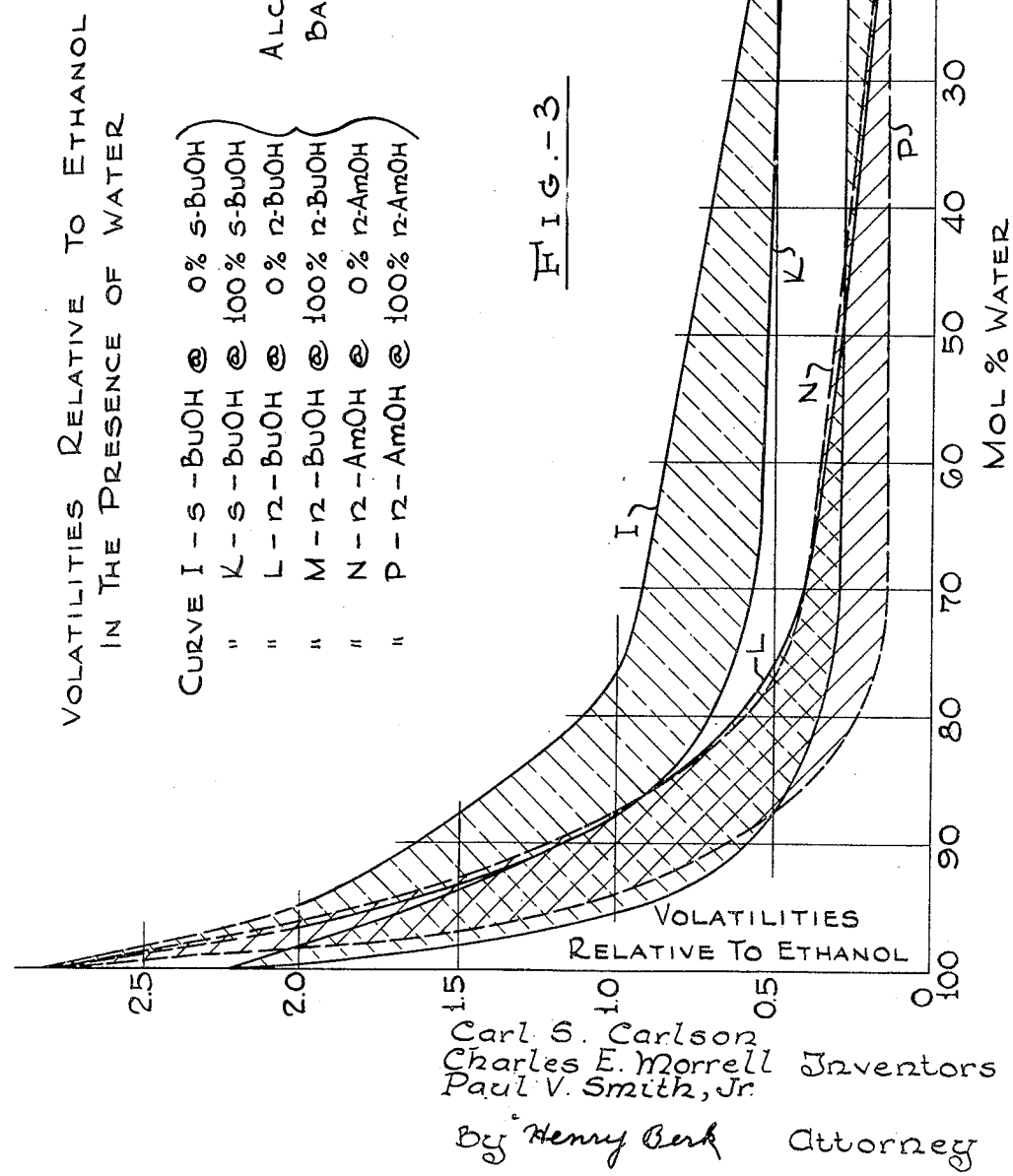

Figure 3 shows the volatilities of normal and secondary butyl alcohols and normal amyl alcohol relative to ethanol. From the areas of the curves given, it is evident that normal butyl alcohol cannot be separated from either normal amyl alcohol or secondary butyl alcohol except at extremely high water dilution above 97 mol percent. On the other hand, normal amyl alcohol cannot be separated from secondary butyl alcohol at these high water dilutions but recourse must be had to dilutions below 85 mol percent. It is obvious, therefore, that both normal butyl and normal amyl alcohol cannot be separated from secondary butyl alcohol in a single distillation. Instead normal butyl alcohol would be separated from normal amyl alcohol and secondary butyl alcohol at water concentrations above 97 mol percent and the normal amyl alcohol could then be separated from the secondary butyl alcohol at water concentrations below 85 mol percent. If normal propyl alcohol were present it would be separated along with the normal butyl alcohol at high water concentrations.

In a wide-boiling mixture of alcohols, such as obtained in the Fischer synthesis, the two most difficultly removable impurities (that is, alcohols other than the normal primary alcohols) are isopropanol and secondary butanol. These two alcohols have approximately the same volatilities relative to ethanol at a water concentration of 90 mol percent. Below this water concentration the volatility of secondary butanol approaches that of normal propanol very rapidly, being nearly identical with that for normal propanol at about 81 mol percent and lower water concentrations. Above 90 mol percent water the volatility of normal propanol increases rapidly, approaching that of isopropanol.

However, isopropanol and secondary butanol can easily be separated by ordinary distillation of the water azeotropes of the alcohols. Hence, if a feed mixture of alcohols containing these compounds is fractionated to separate the principal normal primary alcohols into separate cuts, the isopropanol will distill with the ethanol cut and the secondary butyl alcohol will distill with the normal propanol cut.

Thus the advantages of the present invention may be accomplished by fractionating the feed mixture of oxygenated conmpounds from the Fischer synthesis into a methanol-ethanol fraction, and a fraction containing all higher boiling alcohols. Each of these fractions is then distilled in the presence of aqueous reflux of carefully controlled water concentration. It may be desirable in some cases to separate the higher boiling fraction into a propanol fraction and a higher boiling fraction and extractively distill each of these fractions in the presence of the required amounts of water.

Alternatively, the invention may be practiced by splitting, by ordinary fractional distillation, the oxygenated compounds into (1) those compounds boiling up to and including normal propanol, and (2) those boiling higher than normal propanol and then extractively distilling each of these fractions with water. Under some circumstances it may be desirable to make this split so that some normal propanol is present in each of these fractions. This latter method of operating has the advantage that close control of the initial fractionation is avoided.

As pointed out above, the fractions obtained by any one of the above methods are each extractively distilled with water. However, it may be desirable to extractively distill the $C_3$–$C_5$ alcohol fraction and particularly the $C_4$–$C_5$ alcohol fraction with a solvent such as a liquid hydrocarbon oil which is non-reactive with the alcohols and is liquid at the distillation temperature and boils no lower than the highest boiling constituent to be separated. This method of operating is advantageous because of the very low solubility of the higher alcohols in water, necessitating very high water concentrations when using water as the solvent.

The amount of water in the reflux in each instance must be maintained within narrow limits, depending upon the fraction being distilled in order to completely separate the undesired components and obtain pure normal primary alcohols. This is clear from a study of Figures 1, 2 and 3 as pointed out above. The amount of water required for the extractive distillation of each cut is set forth in the following table:

TABLE II
*Purification of primary normal alcohols*

| Cut to be Purified (Boiling range of primary-normal alcohol) | $H_2O$ Concentration (Mol Per Cent) Range in Extractive Distillation | |
| --- | --- | --- |
| | Operable [1] | Preferred |
| $C_1$–$C_2$: | | |
| isopropanol minor constituent | above 65 | above 80 |
| isopropanol major constituent | above 80 | above 90 |
| $C_1$–$C_3$: | | |
| ethanol major constituent | above 84 | 88–95 |
| n-propanol major constituent | above 86 | 88–95 |
| $C_3$ cut alone | above 86 | above 90 |
| $C_3$–$C_5$ cut | 86–95 | 88–91 |
| $C_4$–$C_5$ cut | above water solubility limit, generally above 90 mol per cent | above 98 mol per cent when n-butanol predominates and above 99.2 mol per cent when n-pentanol predominates at atmospheric pressure |

[1] The operable water concentration range for the purpose of this table is taken as that water concentration at which an alpha of at least 1.2 is realized between the key components. Although possible, it is not economically feasible to separate between the components when the alpha is less than 1.2.

As pointed out above it is desirable to provide some method of removing undesired non-alcoholic constituents from the alcohols. This is preferably accomplished by means of an extractive distillation with water as described in copending application, Serial No. 794,589, filed December 30, 1947. This extractive distillation may be either before or after the ordinary distillation into separate cuts. This preliminary extractive distillation to separate non-alcoholic constituents is carried out in the presence of a much wider range of water concentrations than that used in the second step to separate the normal primary alcohols. Thus, the water concentration for separating non-alcoholic compounds from alcohols may be between 65 and 99 mol percent on each plate, preferably 75 to 85 mol percent. When the crude mixture of oxygenated compounds is first separated into individual cuts by ordinary distillation and then extractively distilled with water in two stages, first to separate non-alcoholic constituents and then to separate normal primary alcohols, it is desirable to carry out the first distillation at as low a water concentration as possible and in any case lower than that in the second stage so as to avoid the use of an intermediate stripping step to separate the undesired water. It is, of course, not always necessary to employ two extractive distillation steps and in fact it is preferred in most cases to remove the non-alcoholic constituents with the rejected alcohols.

The aqueous reflux used may be water or other solvent of high water content, such as aqueous solutions of salts as the chlorides, nitrates, sulfates, acetates, etc., of sodium, potassium, ammonium and the like, dilute acids, such as those obtained by distilling the crude water layer from the Fischer synthesis, dilute mineral acids, etc.

The solvent may be a hydrocarbon oil, which is liquid under the distillation conditions or it may be any one of several other liquid organic compounds. For example, those found useful include sulfolane, phenol, ethylene glycol, propylene glycol, butylene glycol, the various glycol ethers such as the mono-ethyl ether of ethylene glycol, the various glycol ether esters, such as ethyl Carbitol acetate, ethyl Cellosolve acetate, butyl Carbitol acetate, butyl Cellosolve acetate, etc.

The preliminary fractional distillate to segregate the cuts described above, takes place in equipment well known in the art and by methods likewise well known. The extractive distillation of the cuts thus obtained is carried out in columns of practical size, including a rectification zone and a stripping zone for countercurrent vapor-liquid contact under reboiling and refluxing conditions. The amount of water or other aqueous reflux necessary to effect the desired separation is introduced into an upper part of the rectification zone to effectively modify the relative volatilities of the compounds to be separated. The separation can be effected in a continuous manner under steady state conditions to obtain product streams of desired purities and constant compositions while supplying the large quantity of water in the upper part of the rectification zone. The temperature of the water introduced in the rectification zone is preferably close to the temperature of the liquid on the feed plate, although it may be lowered to partially condense vapors ascending to the water-feed plate. In some cases it may be desirable to carry out the distillation under superatmospheric pressures and at higher temperatures.

Since the efficient separation is essentially continuous, the reflux has to be added continuously near the top of the fractionating column, while the mixture of alcohols to be separated is fed continuously into the column at a lower point, and while sufficient heat is provided to afford distillation throughout the column.

The feed stream of the alcohols to be separated in the presence of liquid aqueous reflux is preferably introduced into a fractionating column between an upper rectification section and a lower stripping section at a point where the ratio of the alcohols to be separated in the fraction is similar to the ratio of the alcohols in the internal reflux descending through the column.

The feed stream is preferably heated to a temperature close to that of the internal liquid reflux under practically equilibrium boiling conditions at the point of introduction. The preheated stream may be liquid, partially vaporized, or completely vaporized when introduced to the fractionating tower.

Vapors of the alcohols introduced in the feed stream at the bottom of the rectification zone in the fractionating column pass up the rectification zone in contact with descending internal liquid reflux including water under practically equilibrium boiling and refluxing conditions.

Due to the fact that water, considerably in excess of the water distilled, is introduced to mix with the condensate near the top of the rectification zone, the water concentration in the internal reflux at the top of the rectification zone is higher than the water concentration in the vapors passing up through the zone. Contrasted, therewith, in the normal rectification of alcohols from an aqueous feed, the water concentration diminishes rapidly toward the limiting concentration of the aqueous azeotropes in the vapors ascending the fractionating tower.

Under steady state conditions in the fractionation or distillation zone, the internal reflux having adequate water concentration for accomplishing the separation of the alcohol mixtures, tends to have a nearly constant water concentration in the homogeneous liquid phase at each plate except in cases where a very dilute feed is used. In any case, operation with different water concentration in the stripping and enriching zones is quite feasible. This internal reflux in flowing from the top to the bottom becomes richer in the alcohols found least volatile while the other components of the feed become distilled overhead.

The overhead vapors from the rectification zone are enriched in one or more of the organic components rendered relatively more volatile by the high water content in the liquid reflux while the remaining portion of the organic material introduced with the feed is dissolved in the internal reflux.

The functioning of the stripping zones in the fractionating towers, where distillation occurs in the presence of large quantities of aqueous reflux, may be described as follows:

The dilute aqueous solution of the wide-boiling compounds to be separated, as in the liquid reflux from the bottom of the rectification zone, flows downwardly through the stripping zone in countercurrent contact with ascending vapors evolved from the solution under reboiling conditions. A sufficiently high concentration of water is maintained in the liquid flowing down through the stripping zone as in the rectification zone, to make the liquid progressively richer in those components made less volatile while the remaining components are stripped from the liquid. Under essentially equilibrium reboiling and refluxing conditions in the stripping zone, the more volatile components may be removed as vapor overhead from the stripping zone at the same rate that those components enter the stripping zone as part of the liquid feed to this zone and a dilute aqueous solution of the less volatile components freed from the more volatile components may be withdrawn from the bottom part of the stripping zone.

Figure 4:
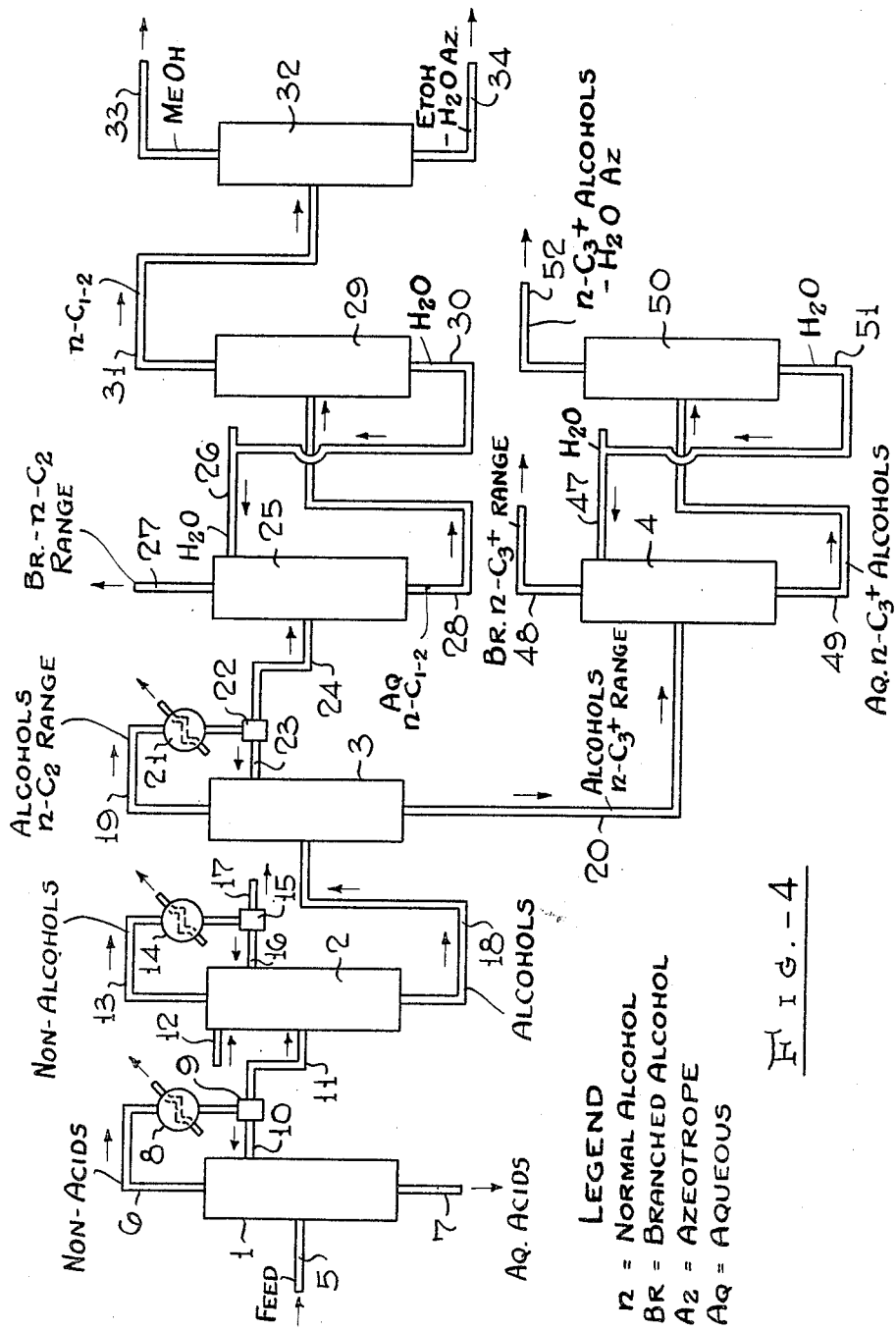

Referring now to Figure 4, a fraction of the above composition obtained in the Fischer synthesis is introduced by line 5 into the midpoint of tower 1, the interior of which is provided with means for obtaining efficient countercurrent liquid-vapor contacting e. g. such conventional means as bubble plates or packing. Column 1 is maintained under such conditions of temperature, feed rate, reflux ratio, etc., that all compounds more volatile than the acids are removed overhead. These include alcohols, ketones, aldehydes, esters, acetals, ketals, and any small amount of hydrocarbons or ethers present. These compounds are withdrawn through line 6, leaving an aqueous acid bottoms which is withdrawn through line 7. The overhead vapors are passed through condenser 8 to a receiver 9. A portion of the condensate collected in receiver 9 is returned to the top of column 1 as external reflux through line 10. The remaining portion of the distillate collected in receiver 9 is withdrawn through line 11. This mixture is then introduced into the middle portion of tower 2 where it is fractionated in the presence of a liquid stream of water introduced through line 12. Conditions are maintained in tower 2 such as to cause distillation of the alcohols in the presence of water on each plate. A sufficient amount of water is added through line 12 so that it is present to the extent of 65 to 99 mol percent on each plate, preferably 75 to 85 mol percent. Thus the overhead vapors from tower 2 consist of carbonyls, esters, acetals, light hydrocarbons (if present), small amounts of alcohols, and ethers. These are withdrawn through line 13, condensed in cooler 14 and collected in accumulator 15. A portion of the material in receiver 15 is passed by line 16 to the top of tower 2 as internal reflux. The remainder is withdrawn through line 17 for further separation, if desired.

When hydrocarbons are present in the feed to tower 2, heavy components thereof often do not distill overhead but are removed as bottoms. These hydrocarbons easily separate out as a highly insoluble phase and can be decanted before the bottoms are further processed.

The alcohols freed of undesired materials are removed from the bottom of tower 2 through line 18 and are introduced into the middle portion of tower 3 where they are fractionated to take overhead, through line 19, methanol, ethanol, isopropanol, t-butanol, and water.

This overhead is condensed in cooler 21 and collected in accumulator 22 from which a portion is returned to tower 3 through line 23 as reflux and the remainder passed by line 24 to the midpoint of tower 25 where it is subjected to fractionation in the presence of large quantities of water introduced through line 26. Conditions are maintained in tower 25 such as to cause distillation of the alcohols in the presence of water on each plate as described in connection with tower 2. A sufficient amount of water is added through line 26 so that it is present to the extent of more than 80 mol percent on each plate. Under these conditions the isopropyl alcohol and tertiary butanol are rendered most volatile and are removed through line 27 together with a small amount of water. The remaining aqueous mixture of methanol and ethanol is withdrawn from tower 25 through line 28 and introduced into the midsection of tower 29 where the alcohols are recovered from the bulk of the water, which is withdrawn through line 30 and passed to line 26 to be used as the aqueous reflux introduced into the top of tower 25. A mixture of methanol and the water-ethanol azeotrope is withdrawn overhead through line 31 and introduced into the midsection of tower 32 from which anhydrous methanol is withdrawn overhead through line 33 and the ethanol-water azeotrope through line 34.

Returning again to tower 3, the bottoms fraction containing normal propanol, normal, secondary, and isobutanol and all higher boiling alcohols is withdrawn through line 20 and is introduced into the midsection of tower 4 where it is fractionated in the presence of large quantities of water introduced through line 47. Sufficient water is introduced through line 47 to maintain between 88 and 91 mol percent on each plate. The operation of this tower is similar in all respects to that of towers 2 and 25. By maintaining the volume of water within the limits given, all of the secondary butyl, isobutyl, secondary-, tertiary-, isoamyl and higher alcohols will be withdrawn overhead through line 48 and all of the normal propyl, normal butyl and normal amyl alcohols will remain as bottoms and be withdrawn as an aqueous solution through line 49. This aqueous solution of normal alcohols is passed into tower 50 where it is separated from the bulk of the water which is recycled through line 51 to line 47 and used as the aqueous reflux introduced to the top of tower 4. The normal alcohol-water azeotropes are removed from tower 50 through line 52 from which the normal alcohols are separated by known dehydration means and normal distillation.

Returning now to tower 3 it is within the scope of this invention to operate tower 3 so that the alcohols are separated into an overhead fraction consisting of methanol, ethanol, isopropanol, normal propanol, isobutanol, secondary butanol and tertiary butanol, leaving a bottoms fraction consisting of normal butanol and all higher boiling fractions. Each of these fractions is extractively distilled with the required amounts of water in towers 25 and 4 respectively as described above, except that in this modification an amount of water is introduced into tower 25 to maintain above 86 mol percent (preferably 88-95 mol percent) on each plate. In those cases in which the source of the alcohols is from the Fischer synthesis, ethanol will be the major constituent, in which case it is even more preferable to maintain a water concentration between 90 and 94 mol percent on each plate. In tower 4, the water concentration must be maintained above 90 mol percent (preferably above 98 mol percent when normal butanol predominates and above 99.2 mol percent when normal pentanol predominates). The large amounts of water required by this fraction is due to the very low solubility of the butanols and pentanols in water. For this reason, it may be desirable to distill the fraction in the presence of a non-polar solvent such as white oil as described below in connection with Figure 6.

Instead of fractionating the mixture of alcohols in tower 3 so that all of the normal propanol goes overhead it may often be desirable to operate this tower less efficiently in which case some of the normal propanol may be withdrawn in the bottoms. In such a case, the extractive distillation in tower 4 may be conducted with lesser amounts of water as was described above when all of the normal propanol was withdrawn in the bottoms, e. g. the water concentration on each plate may be between 86 and 95 mol percent and preferably between 88 and 91 mol percent.

Figure 5:
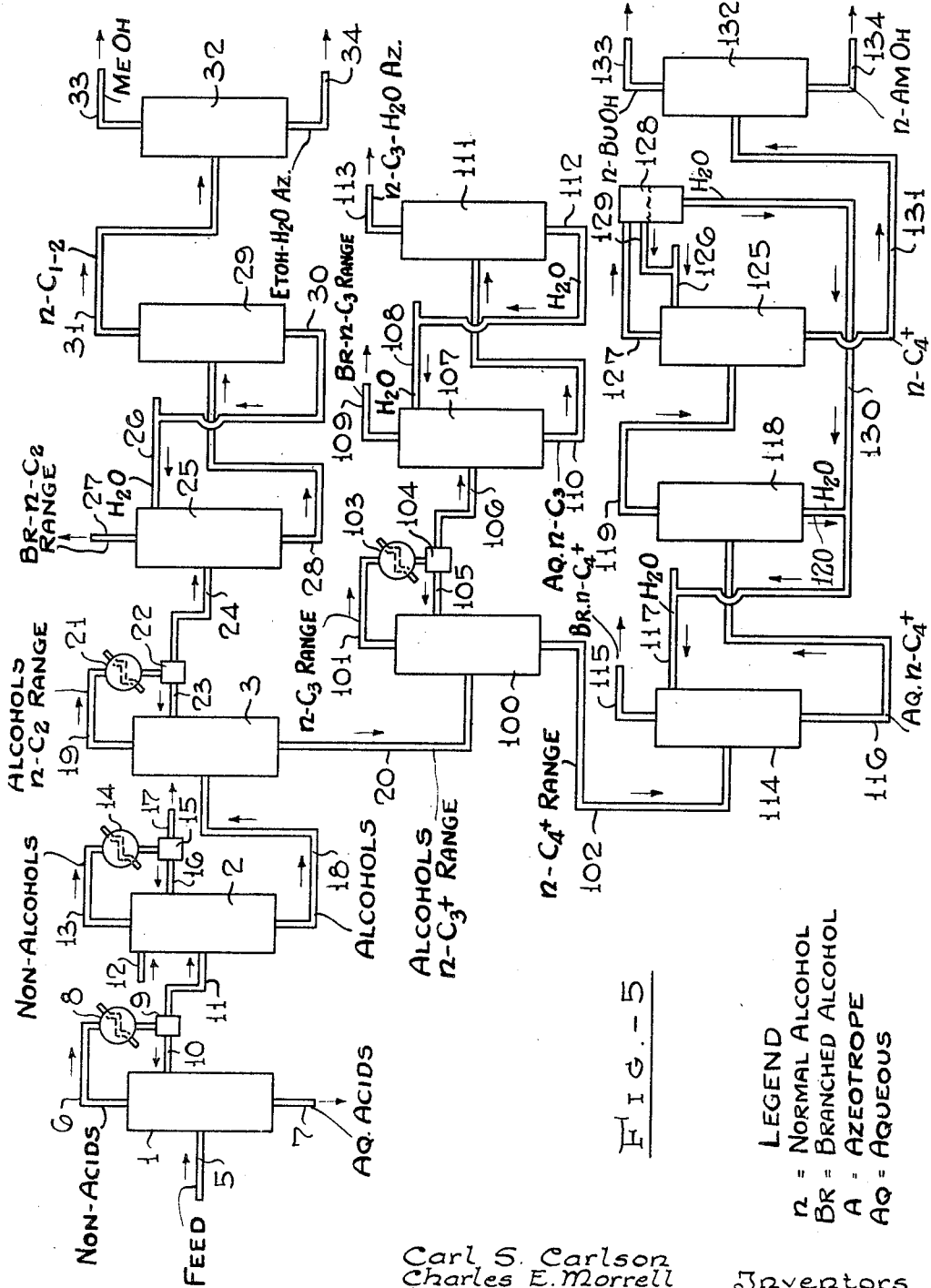

In Figure 5 is illustrated a modification of the first embodiment of the process of Figure 4 in which the bottoms from tower 3 are subjected to further normal fractionation to give an overhead fraction containing alcohols boiling in the range of normal propyl alcohol and a bottoms fraction containing all higher boiling alcohols than normal propyl alcohol. Referring, therefore, to this drawing the bottoms from tower 3 containing normal propanol, normal, secondary, and isobutanol and all higher boiling alcohols is removed through line 20 and passed to tower 100 where it is again fractionated to take overhead all alcohols boiling within the range of normal propyl alcohol and to remove as bottoms all higher boiling alcohols. Each of the two fractions obtained in tower 100 are subjected to fractional distillation in the presence of large quantities of water to effect separation between the normal primary alcohols on the one hand and the branched primary, secondary, and tertiary alcohols on the other. The normal propanol cut is drawn overhead through line 101 and the bottoms fraction containing normal butyl and higher alcohols is withdrawn through line 102. The overhead fraction withdrawn through line 101 consists of normal propanol, secondary butanol, isobutanol and tertiary amyl alcohol. This fraction is condensed in cooler 103 and collected in accumulator 104 from which a portion is returned through line 105 to the top of tower 100 as reflux therein. The remainder is passed by line 106 to the midsection of tower 107 where it is subjected to distillation in the presence of large quantities of water introduced through line 108. Sufficient water is introduced through line 108 to maintain above 90 mol percent on each plate. The operation of this tower is similar in all respects to that of towers 2, 4 and 25 of Figure 4. By maintaining the volume of water within the limits given, all of the secondary butyl, isobutyl and tertiary amyl alcohols will be withdrawn overhead through line 109 and all of the normal propyl alcohol will remain as bottoms and be withdrawn as an aqueous solution through line 110. This aqueous solution of normal propyl alcohol is passed into tower 111 where it is separated from the bulk of the water which is recycled through line 112 to line 108 and used as the aqueous reflux introduced at the top of tower 107. The normal propanol-water azeotrope is removed from tower 111 through line 113 and dehydrated according to known means.

The bottoms fraction from tower 100 consisting of higher alcohols in aqueous solution is withdrawn through line 102 and passed to the midsection of tower 114 where it is fractionally distilled in the presence of large quantities of water introduced through line 117. A sufficient amount of water is added through line 117 so that it is present on each plate below the alcohol feed point to the extent of above 98 mol percent. The water concentration above the alcohol feed point will approach very closely the water concentration below the alcohol feed point. By operating under these conditions all of the branched alcohols and secondary and tertiary alcohols are taken off overhead through line 115 and all of the normal primary alcohols are withdrawn in aqueous solution through line 116. This aqueous solution of normal primary alcohols is introduced into the midsection of tower 118 where they are distilled to remove the bulk of the water. The aqueous azeotropes of the alcohols are removed through line 119 and passed to tower 125 to complete the removal of water. The water is removed from tower 118 by line 120 and introduced into line 130 to be recycled to tower 114 as the aqueous reflux therein. The dehydration in tower 125 is preferably carried out in known manner in the presence of an entrainer, for example, isopropyl ether or other substance well known in the art capable of removing water. Accordingly, isopropyl ether is introduced to the top of column 125 through line 126 and the azeotrope of isopropyl ether and water is removed overhead through line 127 and passed to decanter 128 where two layers are formed. The upper, or isopropyl ether-rich layer, is recycled to the column 125 through line 129. Substantially ether-free water is removed through line 130 and recycled to tower 121 as the aqueous reflux added through line 122. The distillation is carried out continuously removing essentially in column 125 all of the water overhead from the column and withdrawing a substantially anhydrous mixture of alcohols from the bottom of tower 125. These alcohols are removed through line 131 and passed to tower 132 where normal butyl alcohol is removed overhead through line 133 and normal amyl and higher primary alcohols are removed as bottoms through line 134.

Figure 6:
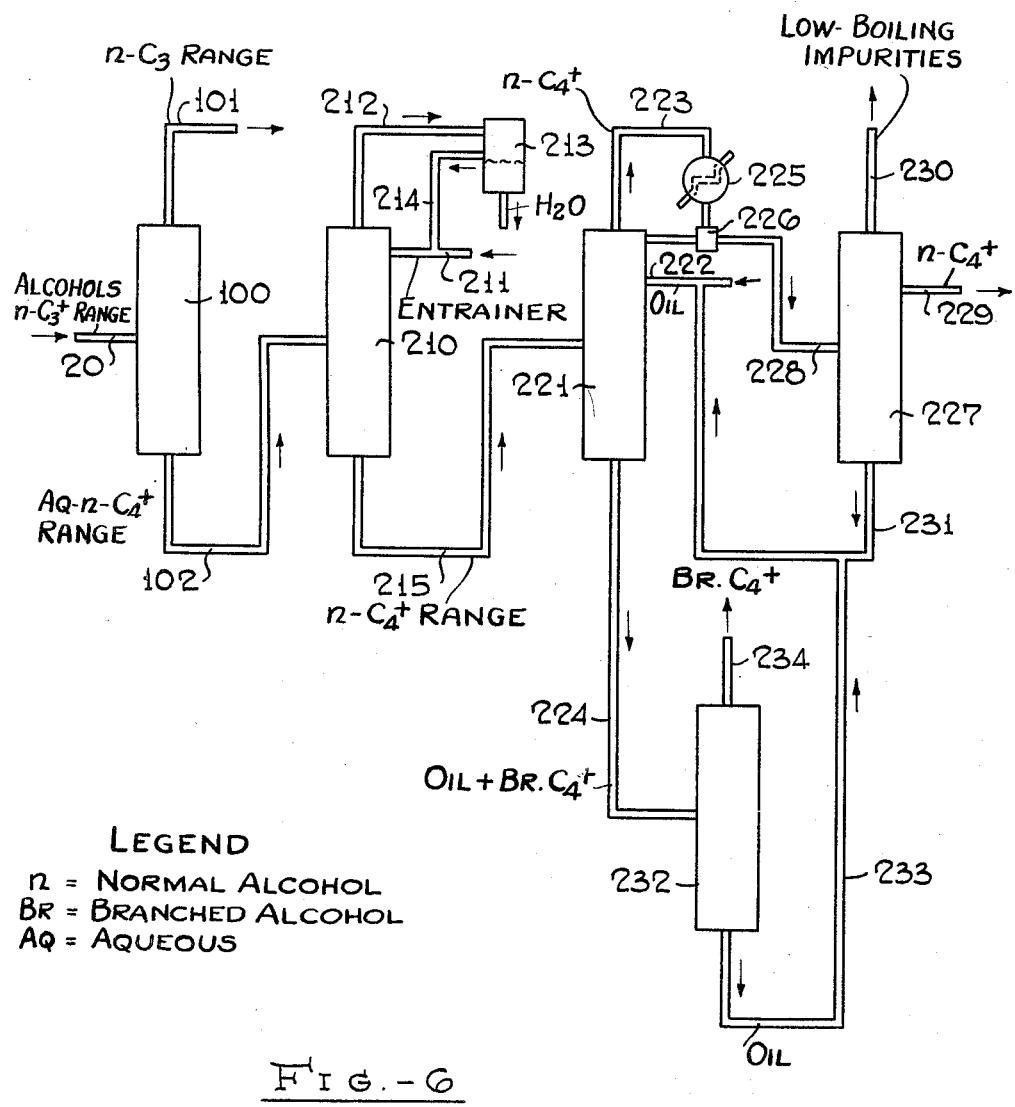
Figure 6 illustrates a modified flow plan of a portion of Figures 4 and 5.

In Figure 6 is shown a modification of the process of treating the bottoms fraction from tower 100 in Figure 5. Referring therefore to Figure 6, the aqueous bottoms from tower 100 are passed by line 102 to an intermediate point of tower 210 where they are distilled to separate the alcohols from the water. This may be accomplished in any manner known in the art, but is preferably carried out by distilling the alcohols in the presence of an entraining agent for the water, such as isopropyl ether or other substance well known in the art capable of removing water. Accordingly, isopropyl ether is introduced into the top of column 210 through line 211 and the azeotrope of isopropyl ether and water is removed overhead through line 212 and passed to decanter 213 where two layers are formed. The upper, or isopropyl ether-rich layer is recycled to the column 210 through line 214. The distillation is carried out continuously removing essentially in column 210 all of the water overhead and withdrawing a substantially anhydrous mixture of alcohols from the bottom of tower 210. These alcohols are removed through line 215 and passed to an intermediate point of tower 221 where they are fractionally distilled in the presence of large quantities of a hydrocarbon oil such as a white oil boiling from 396–522° F. A sufficient amount of oil is added through line 222 so that it is present on each plate to the extent of about 85–99 volume percent, preferably about 90 volume percent on each plate, above the alcohol feed point. Conditions are maintained on each plate of the tower such that the liquid mixtures of the alcohols are at their boiling points in the oil and are continuously being contacted with vapors boiled from the plates below. Because of the enhanced volatility of the normal primary alcohols in relation to other alcohols the vapors are relatively rich in the former and poor in the latter. By controlling the amount of alcohol reflux and consequently the reflux ratio and the number of plates, the actual degree of separation may be varied until the desired product purity and recovery are obtained. Thus suitable temperature and reflux conditions are maintained in the tower so that the normal primary alcohols are taken off overhead through line 223 and all of the branched alcohols and secondary and tertiary alcohols are taken off as a solution in oil through line 224. The overhead fraction containing the normal alcohols and any volatilized oil and low boiling impurities removed through line 223 is condensed in cooler 225 and collected in accumulator 226. A portion of the condensate in accumulator 226 is returned to the top of tower 221 as reflux while the remainder is passed to tower 227 through line 228. The fraction introduced into tower 227 is apt to contain some low boiling impurities, particularly the next lower boiling alcohol, in this case normal propyl alcohol. Tower 227 is operated so as to separate the normal butyl, normal amyl and higher normal alcohols from both residual oil and lower boiling alcohols. Since these lower boiling alcohols accumulate in the top of the column, the normal alcohols are withdrawn a few plates from the top of the column through line 229. The impurities are drawn off through line 230 and the residual oil is withdrawn through line 231. The normal primary alcohols withdrawn through line 229 may be easily separated by ordinary fractionation, if desired.

The bottoms from tower 221 are passed by line 224 to tower 232 where the branched primary, secondary, and tertiary alcohols are distilled overhead from the oil through line 234 and the oil recycled through line 233.

In Figure 7 is illustrated a modification of the process of Figure 4 in which the preliminary distillation in the presence of large quantities of water to remove non-alcoholic compounds is eliminated and the non-alcoholic compounds are separated with the corresponding branched primary, secondary, and tertiary alcohols. Accordingly, in Figure 7, the fractionating tower of Figure 4 is eliminated and the neutral oxygenated compounds are immediately fractionated into three fractions, each of which is then distilled with the appropriate large quantites of water to separate overhead the branched primary, secondary and tertiary alcohols together with the non-alcoholic constitutents.

Referring therefore to Figure 7, a water-layer having the composition used in Figure 4 is introduced into tower 301 which operates in the same manner as tower 1 of Figure 4 to separate overhead the nonacid constituents of the feed from the bulk of the water. These acid-free compounds are introduced into the midsection of tower 303 which operates in the same manner as tower 3 of Figure 4. In this tower distillation is carried out so as to take overhead methyl alcohol, ethyl alcohol, isopropyl alcohol, t-butanol, acetone, acetaldehyde, propionaldehyde, butyraldehyde, dimethyl acetal, methyl ethyl ketone, ethyl acetate, light hydrocarbons, and other oxygenated compounds distilling in this temperature range.

This fraction is then passed to tower 325 by line 324 where it is distilled in the presence of 80 to 99 mol percent of water as described in connection with tower 25 of Figure 4 to take overhead through line 327 isopropyl alcohol, tertiary butanol, acetone, acetaldehyde, propionaldehyde, butyraldehyde, dimethyl acetal, methyl ethyl ketone, ethyl acetate and hydrocarbons. Methyl alcohol, ethyl alcohol and water are removed through line 328, separated from the bulk of water in tower 329 and into the individual alcohols in tower 332 as described in Figure 4 with respect to towers 29 and 32 respectively.

Returning to tower 303, material boiling above ethyl alcohol is withdrawn through line 329 and passed to tower 304 where it is fractionated to separate overhead a fraction containing normal propyl alcohol, iso and secondary butyl alcohol, tertiary amyl alcohol, secondary amyl alcohol, isopropyl acetate, diethyl acetal, methyl normal propyl ketone, methyl isopropyl ketone, diethyl ketone, ethyl propionate, valeraldehyde, isovaleraldehyde, light hydrocarbons, and other oxygenated compounds boiling in this temperature range. This material is passed by line 345 to tower 346 where it is distilled in the presence of 86 to 99 mol percent of water to separate overhead via line 348 iso and secondary butyl alcohol, tertiary amyl alcohol, secondary amyl alcohol, isopropyl acetate, diethyl acetal, methyl normal propyl ketone, methyl isopropyl ketone, methyl isobutyl ketone, diethyl ketone, ethyl propionate, valeraldehyde, isovaleraldehyde and light hydrocarbons. An aqueous solution of normal propyl alcohol is withdrawn through line 349 and separated from the bulk of the water in tower 350 as described in connection with tower 50 of Figure 4.

Bottoms from tower 304, consisting of normal butyl alcohol, normal branched primary and secondary amyl alcohol and all other constituents boiling thereabove including aldehydes, ketones, esters, hydrocarbons, etc., is passed by line 341 to tower 353 where it is distilled in the presence of 85-99, preferably 98 to 99 mol percent water to separate overhead a fraction consisting of branched primary and secondary amyl alcohols, any aldehydes, ketones, esters, and hydrocarbons present and a bottoms fraction consisting of normal butyl, normal amyl and higher primary alcohols. This fraction is passed by line 355 to tower 361 where it is separated from the bulk of the water. The aqueous alcohols removed from tower 361 are passed by line 363 to tower 364 where they are dehydrated in the presence of an entrainer such as isopropyl ether as described in connection with tower 125 of Figure 5. The dehydrated alcohols are then separated in tower 371 in the same manner as described in connection with tower 132 to Figure 5.

The nature and objects of the present invention having been thus fully set forth and specific examples of the same given, what is claimed as new and useful and desired to be secured by Letters Patent is:

1. A method of separating a wide boiling mixture of organic compounds including normal, primary, branched primary, secondary and tertiary alcohols boiling within the range of methanol through n-pentanol which comprises introducing said mixture into a first fractionation zone, fractionating said mixture in said first fractionating zone to obtain overhead a first fraction consisting of all compounds boiling within the range of the normal primary alcohols having up to and including 2 carbon atoms per molecule and a bottoms product containing all compounds boiling within and above the range of the normal primary alcohols having 3 and more carbon atoms, fractionally distilling the fraction boiling within the range of the normal primary alcohols having up to and including 2 carbon atoms per molecule in the presence of at least 65 mol percent water, fractionally distilling the fraction consisting of all compounds boiling within and above the range of the normal primary alcohols having 3 and more carbon atoms in the presence of between 86 and 95 mol percent water to completely separate the normal primary alcohol from the remaining compounds in each of said fractions.

2. The process according to claim 1 in which the fraction boiling within the range of the normal primary alcohol having up to and including 2 carbon atoms per molecule is fractionally distilled in the presence of at least 80 mol percent water, the fraction consisting of all compounds boiling within the range of the normal primary alcohols having 3 and more carbon atoms, is fractionally distilled in the presence of between 88 and 91 mol percent water.

3. A method of separating a wide boiling aqueous mixture of organic compounds including normal primary, branched primary, secondary and tertiary alcohols boiling within the range of methanol through n-pentanol which comprises introducing said mixture into a first fractionation zone, fractionating said mixture to obtain overhead with water a first fraction consisting of all compounds boiling within the range of normal primary alcohols having up to and including 3 carbon atoms per molecule and a bottoms product containing all compounds boiling within the range of normal primary alcohols having 4 and more carbon atoms, fractionally distilling the fraction boiling within the range of the normal primary alcohols having up and including 3 carbon atoms per molecule in the presence of at least 86 mol percent water and fractionally distilling the fraction consisting of all compounds boiling within the range of primary alcohols having 4 and more carbon atoms in the presence of at least 90 mol percent water.

4. The process according to claim 3 in which the fraction boiling within the range of normal primary alcohols having up to and including 3 carbon atoms per molecule is fractionally distilled in the presence of 88 to 95 mol percent water and the fraction containing all the compounds boiling within the range of the normal primary alcohols having 4 and more carbon atoms is fractionally distilled in the presence of at least 98 mol percent water.

5. The method of separating a wide boiling aqueous mixture of organic compounds including normal primary, branched primary, secondary and tertiary alcohols, boiling within the range of methanol through n-pentanol which comprises introducing said mixture into a first fractionation zone, fractionating said mixture in said first fractionation zone to obtain overhead with water a first fraction consisting of all compounds boiling within the range of the normal primary alcohols having up to and including 2 carbon atoms and a portion of the compounds boiling within the range of normal propyl alcohol and the bottoms fraction containing all compounds boiling within the range of the normal primary alcohols having 4 and more carbon atoms and also containing that portion of the compounds boiling in the range of normal propyl alcohol not distilling overhead, fractionally distilling the fraction boiling within the range of normal primary alcohols having up to and including 2 carbon atoms per molecule and also containing normal propyl alcohol in the presence of at least 86 mol percent water and fractionally distilling the fraction containing all the compounds boiling within the range of the normal primary alcohols having 4 and more carbon atoms and also containing normal propyl alcohol in the presence of between 86 and 95 mol percent water.

6. The process according to claim 5 in which the fraction boiling within the range of normal primary alcohols having up to and including 2 carbon atoms per molecule and including a portion of the compounds boiling within the range of normal propyl alcohol is fractionally distilled in the presence of 88 to 95 mol percent water and the fraction containing all the compounds boiling within the range of the normal primary alcohols having 4 and more carbon atoms and containing that portion of the compounds boiling within the range of normal propyl alcohol not distilling overhead is fractionally distilled in the presence of 88 to 91 mol percent water.

7. A method of separating a wide boiling mixture of organic compounds, including normal primary, branched primary, secondary and tertiary alcohols, acetals, esters, ethers, ketals, hydrocarbon, ketones, and aldehydes, boiling within the range of methanol through n-pentanol, which comprises introducing said organic mixture into a first fractionation zone, fractionating said mixture in said fractionation zone to obtain overhead all compounds boiling within the range of the normal alcohols having up to and including 3 carbon atoms and a bottoms fraction containing all the compounds boiling within the range of the normal alcohols having 4 and more carbon atoms, passing said overhead fraction to an intermediate point of a second fractionation zone and the bottoms fraction to an intermediate point of a third fractionation zone, introducing into the top of the said second fractionation zone a sufficient amount of water to maintain above 86 mol percent of water in the internal reflux and introducing into the top of said third fractionation zone a sufficient amount of water to maintain above 90 mol percent of water in the internal reflux, removing overhead from each of said second and third fractionation zones the esters, ethers, hydrocarbons, acetals, ketones, ketals, aldehydes, branched primary, secondary, and tertiary alcohols and removing from the bottom of said second and third fractionation zone an aqueous solution of normal primary alcohols.

8. The process according to claim 7 in which the fraction boiling within the range of normal primary alcohols having up to and including 3 carbon atoms per molecule is fractionally distilled in the presence of 88 to 95 mol percent water and the fraction containing all the compounds boiling within the range of the normal primary alcohols having 4 and more carbon atoms is fractionally distilled in the presence of at least 98 mol percent water.

9. The method of separating a wide boiling mixture of organic compounds including alcohols boiling within the range of methanol through n-pentanol which comprises introducing said organic mixture into a first fractionation zone, fractionating said mixture in said first fractionation zone to obtain overhead a first fraction consisting of all compounds boiling within the range of the normal primary alcohols having up to and including 2 carbon atoms per molecule and a bottoms product containing all compounds boiling within and above the range of the normal primary alcohols having 3 and more carbon atoms, passing said bottoms product to a second fractionation zone, fractionating said bottoms product in said second fractionating zone to obtain overhead a second fraction consisting of all compounds boiling within the range of normal propyl alcohol and as a bottoms product a third fraction containing all the compounds boiling within the range of the normal primary alcohols having 4 and more carbon atoms, fractionally distilling said first fraction in the presence of at least 65 mol percent water, fractionally distilling said second fraction in the presence of at least 86 mol percent water, and fractionally distilling said third fraction in the presence of at least 90 mol percent water to separate the normal primary alcohols in each fraction from the remaining compounds.

10. The process according to claim 9 in which the first fraction is distilled in the presence of at least 80 mol percent water, the second fraction in the presence of at least 90 mol percent water, and the third fraction in the presence of at least 98 mol percent water.

11. A method of separating a wide boiling aqueous mixture of organic compounds including normal primary, branched primary, secondary and tertiary alcohols boiling within the range of methanol through n-pentanol which comprises introducing said mixture into a first fractionation zone, fractionating said mixture in said first fractionation zone to obtain overhead with water a first fraction consisting of all compounds boiling within the range of the normal primary alcohols having up to and including two carbon atoms per molecule and a bottoms product containing all compounds boiling within the range of the normal primary alcohols having 3 and more carbon atoms, passing said bottoms product to a second fractionation zone, fractionating said bottoms product in said second fractionating zone to obtain overhead a second fraction consisting of all compounds boiling within the range of normal propyl alcohol and as a bottoms product a third fraction containing all the compounds boiling within the range of the normal primary alcohols having 4 and more carbon atoms, fractionally distilling the fraction boiling within the range of the normal primary alcohols having up to and including two carbon atoms per molecule in the presence of at least 65 mol percent water, fractionally distilling the fraction consisting of all compounds boiling within the range of normal propyl alcohol in the presence of at least 86 mol percent water and fractionally distilling the fraction containing all the compounds boiling within the range of the normal primary alcohols having 4 and more carbon atoms in the presence of at least 90 mol percent water.

12. A method of separating a wide boiling mixture of organic compounds including esters, ethers, hydrocarbons, ketones, acetals, ketals, and aldehydes and also containing alcohols boiling within the range of methanol through n-pentanol which comprises introducing said mixture into a first fractionating zone wherein vapors of said mixture ascend countercurrently to a liquid reflux of the mixture dissolved in 65–99 mol percent of water whereby the normal volatility relationships of the organic compounds are altered and the ethers, esters, hydrocarbons, ketones, acetals, and aldehydes are rendered more volatile than the alcohols, continually removing water and the esters, ethers, hydrocarbons, aldehydes, acetals, ketals and ketones overhead from the fractional distillation zone, removing a dilute aqueous solution of alcohols as a bottoms product, introducing said bottoms product into a second fractionation zone, fractionating said mixture in said second fractionation zone to obtain overhead a second fraction consisting of all compounds boiling within the range of the normal primary alcohols having up to and including 2 carbon atoms per molecule and a bottoms product containing all compounds boiling within the range of the normal primary alcohols having 3 and more carbon atoms per molecule, passing said bottoms product into a third fractionation zone, fractionating said bottoms product in said third fractionation zone to obtain overhead a third fraction, consisting of all compounds boiling within the range of normal propyl alcohol and as a bottoms product a fourth fraction containing all the compounds boiling within the range of the normal primary alcohols having 4 and more carbon atoms, fractionally distilling each of said second, third and fourth fractions in the presence of sufficiently large quantities of aqueous reflux to completely separate the normal primary alcohols from the remaining alcohols.

13. A process according to claim 11 in which the fraction boiling within the range of the normal primary alcohols having up to and including 2 carbon atoms per molecule is fractionally distilled in the presence of at least 80 mol percent water, the fraction consisting of all compounds boiling within the range of normal propyl alcohol is fractionally distilled in the presence of at least 90 mol percent water and the fraction containing all the compounds boiling within the range of the normal primary alcohols having 4 and more carbon atoms is fractionally distilled in the presence of at least 98 mol percent water.

14. Process according to claim 12 wherein the said second fraction is fractionally distilled in the presence of at least 65 mol percent water, said third fraction is fractionally distilled in the presence of at least 86 mol percent water, and the said fourth fraction is distilled in the presence of at least 90 mol percent water.

15. Process according to claim 12 in which the said second fraction is fractionally distilled in the presence of at least 80 mol percent water, the said third fraction is fractionally distilled in the presence of at least 90 mol percent water and the said fourth fraction is fractionally distilled in the presence of at least 98 mol percent water.

16. A method of separating a wide boiling mixture of organic compound including normal primary, branched primary, secondary and tertiary alcohols boiling within the range of methanol through n-pentanol which comprises introducing said mixture into a first fractionation zone, fractionating said mixture in said first fractionating zone to obtain overhead a first fraction consisting of all compounds boiling within the range of the normal primary alcohols having up to and including 2 carbon atoms per molecule and a bottoms product containing all compounds boiling within and above the range of normal primary alcohols having 3 and more carbon atoms per molecule and fractionally distilling the fraction consisting of all compounds boiling within and above the range of the normal primary alcohols having 3 and more carbon atoms in the presence of between 86–95 mol percent water to completely separate the normal primary alcohols from the remaining compounds in the fraction.

CARL S. CARLSON.
CHARLES E. MORRELL.
PAUL V. SMITH, Jr.

REFERENCES CITED

The following references are of record in the file of this patent:

UNITED STATES PATENTS

| Number | Name | Date |
|---|---|---|
| 887,793 | Guillaume | May 19, 1908 |
| 2,162,963 | McKittrick | June 30, 1937 |
| 2,290,442 | Metzl | July 21, 1942 |
| 2,321,748 | Hopkins et al. | June 15, 1943 |
| 2,360,861 | Pierotti et al. | Oct. 24, 1944 |
| 2,365,912 | Souders | Dec. 26, 1944 |

OTHER REFERENCES

Journal of Research of the National Bureau of Standards, vol. 27, pages 44–46.